June 6, 1944. R. F. HLAVATY 2,350,509
SELF-ALIGNING PULLEY
Original Filed Sept. 15, 1941 2 Sheets-Sheet 1
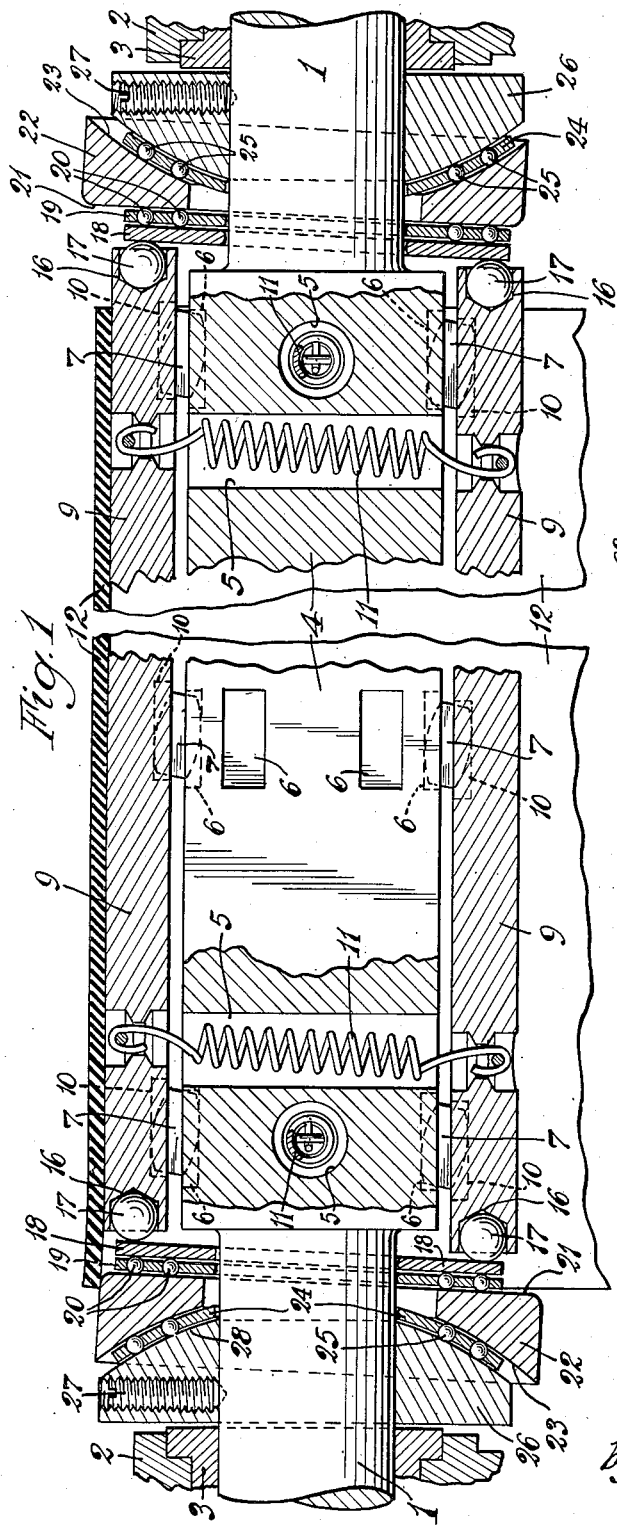
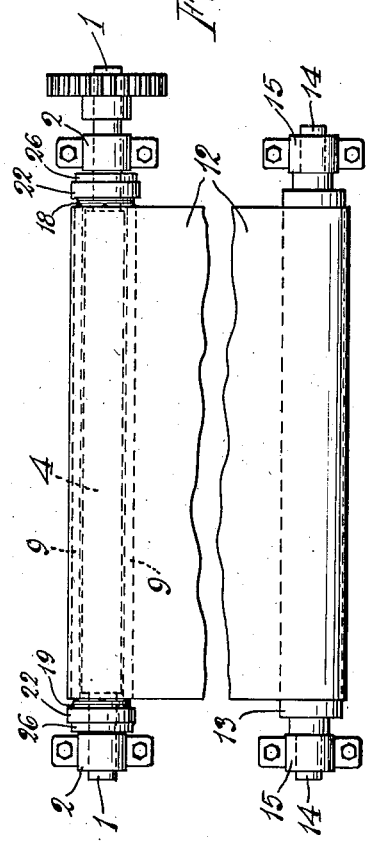
Inventor
Rudolph F. Hlavaty
by Parker & Carter
Attorneys.

June 6, 1944. R. F. HLAVATY 2,350,509
SELF-ALIGNING PULLEY
Original Filed Sept. 15, 1941 2 Sheets-Sheet 2
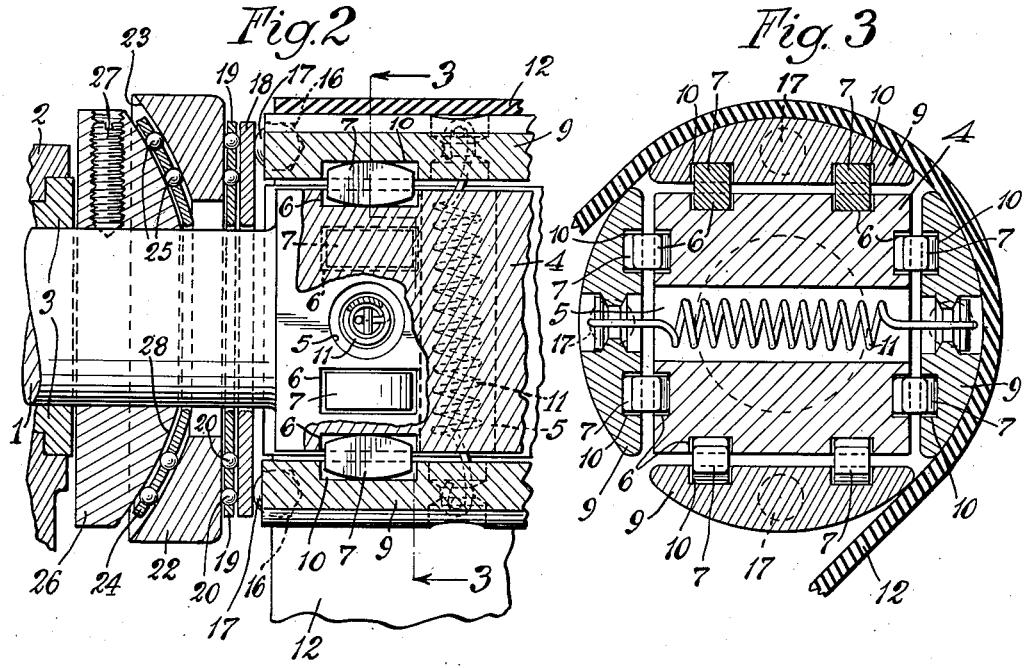
Inventor
Rudolph F. Hlavaty
by Parker & Carter
Attorneys Patented June 6, 1944

2,350,509

UNITED STATES PATENT OFFICE 2,350,509

SELF-ALIGNING PULLEY

Rudolph F. Hlavaty, Cicero, Ill.

Original application September 15, 1941, Serial No. 410,871. Divided and this application July 15, 1942, Serial No. 451,003

12 Claims. (Cl. 74—241)

This invention relates to a self-aligning cylinder, wheel, roller, or other rotary member, either driving, driven, or idling. In one form it may be embodied in a pulley. It has for one object to provide a rotary member which has formed in it or attached to it parts which operate automatically to keep it in alignment or to re-align it. Where the invention comprises a pulley operating with a belt, it serves to keep the belt and pulley aligned or to restore them to alignment.

It is well recognized that most belts and particularly wide or large belts have a tendency to move out of alignment. This tendency is particularly evident in the case of large rubber belts. Almost all belts are susceptible to change due to changing atmospheric and temperature conditions, and it is generally recognized that it is difficult to maintain such belts in alignment. In general practice, hand operated means are provided for re-aligning such belts, and frequent, if not constant, attention is required to maintain such belts properly aligned. It is one of the objects of this invention to obviate the necessity of any hand or manually controlled apparatus and to provide a belt pulley which is automatic and certain in its operation, and which automatically corrects and counteracts a tendency to misalignment.

Another object is to provide self-aligning means which act in response to side movement of the belt out of alignment; automatically to cause reverse side movement of the belt into the position of alignment.

Other objects will appear from time to time throughout the specification and claims.

This invention is illustrated more or less diagrammatically in the accompanying drawings, wherein:

Figure 1 is a longitudinal section with parts broken away, showing both ends of a pulley made according to this invention and in a position of mis-alignment.

Figure 2 is a section taken at the end of the pulley and showing the parts in proper position of alignment.

Figure 3 is a transverse section taken at line 3—3 of Figure 2.

Figure 4 is a plan view, showing the pulley of this invention in combination with a plain or standard pulley.

Like parts are indicated by like characters throughout the specification and the drawings.

In the form of the invention illustrated in Figures 1-3, inclusive, the pulley includes a shaft-like member 1 which is rounded at its ends as shown and may be carried in bearings 2—2, which as shown in Figure 2 are provided with bushings 3. The body of the shaft-like member 2 is enlarged and preferably squared in cross-section as at 4, as shown particularly in Figure 3, and it is provided with one or more perforations 5—5, some of which extend straight through in one plane, and others of which extend straight through in a plane at right angles to the first. These perforations serve the purpose that will be explained below. On each of its faces the body portion is provided with one or more grooves or depressions 6—6, which serve as races and in which rocker members 7—7 are positioned. Positioned externally on each of the faces of the member 4 is a belt contacting pulley portion 9. These portions are shown particularly in Figure 1, are rounded externally on the arc of a circle, and are flat internally; and they are provided with depressions 10 which correspond to the depression 6 of the member 4 and in which the rockers 7 are arranged to fit and to move. As a means for holding the pulley members 9 moveably in position, springs 11 are provided and there is one spring in each of the perforations 5 and preferably at least 2 springs for each pair of pulley members 9. As shown, there are two such springs for each pair, but the number is variable depending upon the size and shape of the pulley members and upon the type of installation in which they are mounted. The springs serve to hold together yieldingly each pair of pulley members 9.

Mounted externally of the pulley is a belt 12, and this belt may be of any size, material, or shape desired. It may be used in an installation in which all of the pulleys are self-aligning, or it may be used as shown in Figure 4 in an installation in which a straight pulley 13 of conventional design is used. As there shown, the pulley 13 is carried by a shaft 14, which is mounted in bearings 15.

In each end of each of the pulley members 9 a ball pocket 16 is formed and a ball bearing 17 is mounted in each such pocket. These bearings abut against a ring or washer 18, of which one is positioned at each end of the self-aligning pulley assembly. Adjacent the ring or washer 18 is a ball carrying disk 19, which is perforated to receive a plurality of ball bearings 20, and these ball bearings are in contact with the flat face 21 of a ring 22, which is provided with a concave opposite face 23. A concave ball carrying member 24 is mounted adjacent the ring 22 and corresponds in shape to its concave face 23. Balls 25 are mounted in the carrier 24. A wedge member 26 is fixed on the shaft portions 1 by a set screw 27. It has a convex face 28 which conforms in shape to the concave face 23 of the member 22 and to the concave shape of the member 24, which carries the balls 25. The construction at each end of the pulley is identical.

This application is a division of my co-pending application, Serial No. 410,871, filed September 15, 1941, and now Patent No. 2,301,542, issued November 10, 1942.

The use and operation are as follows: The parts are shown in proper adjustment without any misalignment in Figure 2. When the belt moves to a misaligned position, the parts may assume the position shown in Figure 1. As there shown, the belt 12 has become misaligned to the left. Its left edge has run off of or extended beyond the left edge of the surface member 9. When that occurs and when the belt runs up on the wedge member 22, as shown in Figure 1, that member is depressed by the pressure of the belt and runs downwardly about the wedge member 26. When that occurs, the uppermost member 9 of Figure 1 is, in effect, carried to the right, and it presses upon the uppermost portion of the right-hand wedge member 22, thus causing that member to rise with respect to the right-hand wedge member 26. As the right-hand member 22 rises, its uppermost portion moves to the right, and correspondingly, its lowermost portion moves to the left, thus carrying the lowermost surface member 9 bodily to the left. To a lesser degree the same movements are carried out with respect to the other surface members. After this leftward movement of the lowermost surface member 9 has occurred, when rotation of the pulley as a whole continues, the belt will be brought into contact with the lowermost member 9, which has been moved to the left, and thus the belt, which has itself moved to the left, will be brought into contact with a surface member which has been moved to the left so that it will be properly centered with respect to that surface member.

When the belt is thus brought into position with the surface member 9, which has been moved to the left, the belt is in proper alignment with this particular surface member, and the belt pressure on the rockers tends to rock those rockers back to the normal or balanced position of Figure 2. The function of the rockers is thus to tend to keep the surface members properly aligned and to restore them to proper alignment when they have moved away. The rockers 7, as shown in Figure 2, are balanced, and the belt pressure exerted through the surface members merely exerts a balanced pressure on these members. When, however, the rockers have been moved to the position of Figure 1 because of misalignment, belt pressure upon them exerted through the surface members tends to rock them back to the balanced position of Figure 2, and when they rock back to the balanced position, they carry or tend to carry the surface members to their proper position with respect to the pulley as a whole.

While the surface members as shown in Figures 1 and 2 have been described as uppermost and lowermost, that description applies only to the drawings. The member described as uppermost in Figures 1 and 2 is, in effect, the outermost member. It is the member most fully in contact with and, therefore, subjected to belt pressure in the position shown in the drawings and as described above.

I claim:

1. In combination in a self-aligning rotor, a rotor body, a plurality of surface members moveably carried thereby, and forming a contacting surface, and a plurality of rocker members positioned between said rotor and each of said surface members, and moveable means supported by said rotor adjacent said surface members and positioned to have contact with a surface with which the self-aligning rotor is in contact, and to be moved by such surface contact, said moveable means being effective, when moved by contact with said surface, to move in the direction opposite to that of misalignment, and thereby to compensate for said misalignment.

2. In combination in a self-aligning rotor, a rotor body, a plurality of surface members moveably carried thereby, and forming a contacting surface, and moveable means supported by said rotor adjacent said surface members and positioned to have contact, and to be moved by such surface contact, said moveable means being effective, when moved by contact with said surface, to move in the direction opposite to that of misalignment, and thereby to compensate for said misalignment, and a plurality of rocker members inserted between said rotor body and each of said surface members, adjacent faces of said rotor body and said surface members being shaped to receive said rocker members moveably.

3. In combination in a self-aligning rotor, a rotor body, a plurality of surface members moveably carried thereby, and forming a contacting surface, and a plurality of rocker members positioned between said rotor and each of said surface members, said rocker members being shaped to provide two oppositely placed inclined surfaces of substantially identical curvature, and moveable means movably supported from said rotor adjacent said surface members and positioned to have contact with a surface with which the self-aligning rotor is in contact, and to be moved by such surface contact, said moveable means being effective, when moved by contact with said surface, to move in the direction opposite to that of misalignment, and thereby to compensate for said misalignment.

4. In combination in a self-aligning pulley, a pulley member, a plurality of surface members moveably carried thereby, and forming a belt contacting surface, and a plurality of rocker members positioned between said rotor and each of said surface members, and moveable wedge-like means adjacent the ends of said surface members and positioned to be contacted and moved by a misaligned belt, said moveable means effective, when moved by the belt, to move a surface member in the direction opposite to that of the misalignment, and thereby to compensate for the misalignment.

5. In combination in a self-aligning pulley, a pulley member, a plurality of surface members moveably carried thereby, and forming a belt contacting surface, and a plurality of rocker members positioned between said rotor and each of said surface members, and fixed and moveable wedge-like means adjacent the ends of said surface members, said moveable means being positioned to be contacted and moved by a misaligned belt, said moveable means effective, when moved by the belt, to move a surface member in the direction opposite to that of the misalignment, and thereby to compensate for the misalignment.

6. In combination in a pulley, a body, a plurality of surface members adapted to contact a belt, said members being mounted for endwise movement along the pulley, and a plurality of rocker members positioned between said body and each of said surface members, and means for imparting endwise movement to one of said members in one direction in response to endwise movement of another of said members in an opposite direction.

7. In combination in a pulley, a body, a plurality of surface members adapted to contact a belt, said members being mounted for endwise movement along the pulley, and a plurality of rocker members inserted between said body and each of said surface members, adjacent faces of said body and said surface members being shaped to receive said rocker members moveably, and means for imparting endwise movement to one of said members in one direction in response to endwise movement of another of said members in an opposite direction.

8. In combination in a pulley, a body, a plurality of surface members adapted to contact a belt, said members being mounted for endwise movement along the pulley, and a plurality of rocker members positioned between said body and each of said surface members, said rocker members being shaped to provide two oppositely placed inclined surfaces of substantially identical curvature, and means for imparting endwise movement to one of said members in one direction in response to endwise movement of another of said members in an opposite direction.

9. In combination with a belt a multi-part pulley in contact with said belt, and rockers positioned between parts of said pulley, means for imparting movement to one of said pulley parts, in response to misalignment of said belt, and means for imparting an opposite movement to another part of said pulley in response to movement of said first-mentioned part.

10. In combination with a belt a multi-part pulley in contact with said belt, adjacent parts of said pulley provided with depressions adapted moveably to retain rocker members, and rocker members positioned in said depressions, said rocker members comprising moveable contacting parts between adjacent pulley parts, means for imparting movement to one of said pulley parts, in response to misalignment of said belt, and means for imparting an opposite movement to another part of said pulley in response to movement of said first-mentioned part.

11. In combination in a pulley a pulley body, a plurality of members adapted to contact a belt, said members being mounted for endwise movement along the pulley and springs secured to said members and tending to resist their movement, each spring being secured to two oppositely placed members and means for imparting endwise movement for one of said members in one direction, in response to endwise movement of another of said members in an opposite direction.

12. In combination in a pulley a pulley body, a plurality of members adapted to contact a belt, said members being mounted for endwise movement along the pulley, and springs secured to said members and tending to resist their movement each spring being secured to two oppositely placed members, and means for imparting endwise movement for one of said members in one direction, in response to endwise movement of another of said members in an opposite direction, and rolling parts positioned between said body and said members.

RUDOLPH F. HLAVATY.